United States Patent Office 2,927,497
Patented Mar. 8, 1960

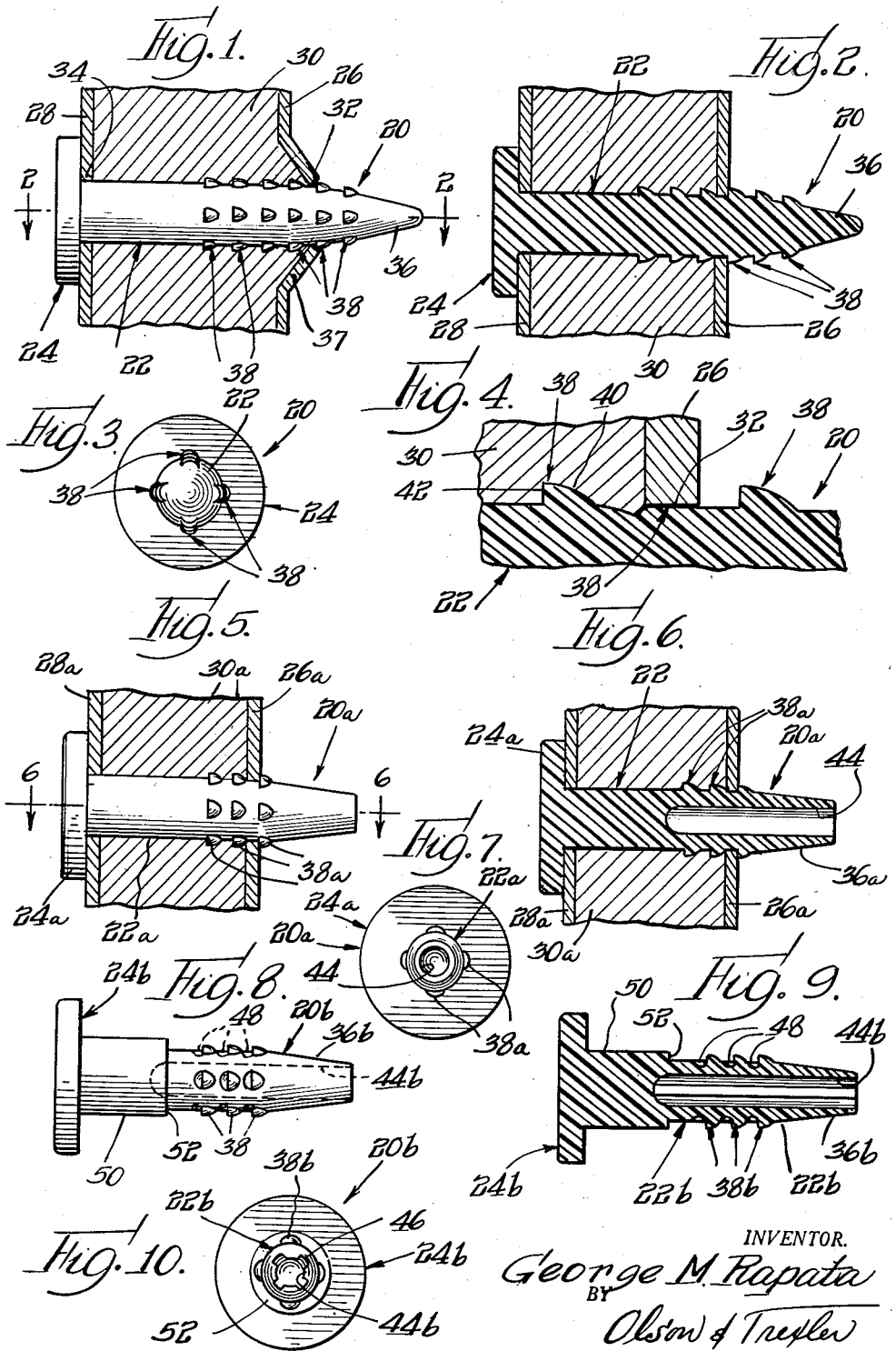
March 8, 1960 — G. M. RAPATA — 2,927,497
PLASTIC DRIVE FASTENER
Filed Aug. 2, 1954
INVENTOR.
George M. Rapata
BY Olson & Trexler
Attys.

2,927,497

PLASTIC DRIVE FASTENER

George M. Rapata, Chicago, Ill., assignor to Illinois Tool Works, Chicago, Ill., a corporation of Illinois Application August 2, 1954, Serial No. 447,239

2 Claims. (Cl. 85—5)

The present invention relates to novel fastening devices and more particularly to novel drive fastening devices adapted to secure a plurality of apertured workpieces or panels together.

While it will become apparent that the fastening devices of the present invention are susceptible of many uses, they are especially adapted for connecting panels of structures such as automobile fire walls. Such fire wall structures usually include a fixed panel and a spaced removable liner or panel with a layer of insulating material such as jute or fiberglass disposed therebetween. In the past the panels of such structures have usually been connected together by means of various metal fasteners, but such metal fasteners have not always been satisfactory since they are relatively complicated and expensive to manufacture and since they usually cannot seal the apertures in the panels sufficiently to prevent engine fumes, dust and the like from passing through the apertures and into the passenger compartment of the automobile. I have previously proposed novel plastic fastening devices capable of overcoming many of the disadvantages of metal fastening devices heretofore in general use for connecting together the panels of a fire wall structure, and it is a primary object of the present invention to provide an improved one-piece plastic fastener which may be easily assembled with apertured panels of a structure such as a fire wall and which is effective to seal the fire wall structure against the passage of engine fumes, dust and the like therethrough.

A more specific object of the present invention is to provide a novel one-piece plastic fastener of the above described general type which may be easily assembled by hand with a work structure and which at the same time is effective securely to retain the apertured panels of the work structure and to seal the apertures of the work structure.

A further object of the present invention is to provide a novel one-piece plastic fastener of the above described general type which is of simple construction and which may be economically manufactured.

Other objects and advantages of the present invention will become apparent from the following description and the accompanying drawings wherein:

Fig. 1 is a partial cross sectional view showing a novel fastener member embodying the principles of this invention assembled with a work structure such as an automobile fire wall;

Fig. 2 is a view similar to Fig. 1 but further showing the fastener member in cross section and a modified fire wall structure;

Fig. 3 is an end view of the fastener member shown in Figs. 1 and 2;

Fig. 4 is an enlarged fragmentary cross sectional view illustrating how lug portions of the novel fastener member are compressed during assembly of the fastening member with the work structure;

Fig. 5 is a cross sectional view similar to Fig. 1 but showing a slightly modified form of the present invention;

Fig. 6 is a cross sectional view similar to Fig. 5 but showing the fastener member in cross section;

Fig. 7 is an end view of the fastener member shown in Figs. 5 and 6;

Fig. 8 is an elevational view of a fastener member embodying a further slightly modified form of the present invention;

Fig. 9 is a cross sectional view of the fastener member shown in Fig. 8; and

Fig. 10 is an end view of the fastener member shown in Figs. 8 and 9.

Referring now more specifically to the drawings wherein like parts are designated by the same numerals throughout the various figures, a fastener 20 embodying the principles of this invention is shown in Figs. 1 through 4. The fastener 20 includes an elongated shank 22 and an integral enlarged head 24 and is formed from a relatively highly resilient plastic material for the purpose set forth fully hereinbelow. While various plastic materials might be utilized it has been found that polyethylene resin is preferred since it has a desired resiliency and it is relatively economical. The fastener 20 is adapted to secure various apertured workpieces or panels together and for the purpose of illustrating the present invention the fastener 20 is shown as securing the panels of an automobile fire wall structure together. Such a fire wall structure usually includes a fixed panel 26 and a removable liner or panel 28 with a relatively thick layer 30 of insulating material such as jute or fiberglass disposed therebetween.

In order to facilitate insertion of the shank 22 through apertures 32 and 34 in the panels 26 and 28, respectively, and through the layer of insulating material, the shank is preferably provided with a solid pointed or tapering entering end portion 36. Furthermore, the panel 26 may be provided with an outwardly deformed conical or dimpled portion 37 surrounding the aperture 32, as shown in Fig. 1, further to facilitate insertion of the shank, although for some installations, the dimple may be omitted as shown in Fig. 2. It will be appreciated that the head 24 serves to retain the removable panel 28 in position when the fastener is assembled through the fire wall structure as shown in Figs. 1 and 2, and in order to prevent inadvertent withdrawal of the fastener from the assembly, the fastener shank is provided with a plurality of lugs or protuberances 38. Another advantage of the dimpled portion 37 is that the edge of the panel defining the aperture 32 is disposed at an angle to the shank for more positive engagement with the shank and the protuberances 38. As shown in the drawings the protuberances 38 are arranged on the shank in a plurality of axially spaced circles with the protuberances in one circle being spaced a distance substantially equal to the thickness of the panel 26 from the protuberances in another circle, whereby the fastener member is adapted to connect the panel members which are to be spaced different distances apart.

It should be noted that the protuberances are formed with inclined cam surfaces 40 facing generally toward the free or entering end and generally radially extending surfaces 42 facing toward the head. With this structure the cam surfaces serve to promote compression or collapsing of the protuberances when they engage the periphery of the panel apertures during assembly of the fastener with the panels as shown in Fig. 4. After the protuberances have passed through the aperture 32 in the panel 26, which aperture preferably has a diameter substantially equal to the diameter of the shank 22, the inherent resiliency of the plastic material from which the fastener is made, causes the protuberances to spring outwardly to position the surfaces 42 thereof for engagement with the panel 26. It will also be appreciated that after the protuberances spring outwardly to their normal positions the material of the shank adjacent the protuberances will also assume its original position so that the shank is effective to completely fill and seal the aperture in the panel. In order further to insure that the protuberances may be readily collapsed so that easy application of the fastener to the workpiece is promoted, it should be noted that the circumferential extent of each individual protuberance is relatively small and is preferably equal to not more than about one-eighth of the total circumference of the shank. With this structure the fastener may be easily assembled with the work by hand and without the aid of tools such as hammers and the like. While each individual protuberance is relatively small, the arrangement of a plurality of circumferentially spaced protuberances on the shank provides the fastener with sufficient holding power for most assemblies.

In Figs. 5, 6 and 7 there is shown a slightly modified form of the present invention which is generally similar to the above described embodiment as indicated by the application of identical reference numerals with the suffix *a* added to corresponding elements. In this embodiment the shank 22*a* is provided with a central bore 44 which extends from the entering end of the shank to a point slightly past the protuberances 38*a* closest to the head 24*a*. By providing the shank with the bore 44 considerable savings in stock material may be effected and in addition, the collapsibility of the shank may be increased so that ease of assembly of the fastener 20*a* with the apertured panels is even further promoted. Since the hollow portion of the shank 22*a* is more readily collapsible than the solid shank 20 described above the protuberances 38*a* may be made slightly larger than the normal size of the above described protuberances 38 for increased holding power, but the protuberances 38*a* are preferably maintained within the circumferential size limit of about one-eighth of the total circumference of the shank.

Figs. 8, 9 and 10 show another slightly modified form of the present invention which is similar to the embodiment of Figs. 5–7 as indicated by the application of identical reference numerals with the suffix *b* added to corresponding elements. In this embodiment the wall of the bore 44*b* is formed with longitudinally extending splines 46 which are disposed between the longitudinally extending rows of protuberances 38*b*. This structure further increases the collapsibility of the shank for promoting easy application of the fastener to the work structure while at the same time sufficient material is left in the shank in position to backup the protuberances so that the protuberances are operable to retain the fastener in the assembly in a secure manner. Furthermore, the shank is provided with small recesses 48 at the base of and in axial alignment with each of the protuberance surfaces 42*b*. These recesses provide spaces into which the protuberances may flow when the protuberances are compressed during application of the fastener to the work structure. However, the recesses are sufficiently small so that the sealing effectiveness of the fastener is not substantially impaired. The shank 22*b* is also provided with an enlarged section 50 and an annular shoulder 52 so that the fastener 20*b* is adapted for use for connecting panels having apertures of different sizes therein. In addition, the shoulder 52 acts to maintain at least a minimum space between the panels. It will be appreciated that, if desired, the shanks of the embodiments described above may also be provided with an enlarged section similar to the section 50 and with recesses similar to the recesses 48.

From the above description it is seen that the present invention has provided an extremely simple and economical one-piece plastic fastener which may be easily applied to a work structure for holding the plurality of apertured panels or the like together in a secure manner. More specifically, it is seen that the present invention has provided a novel one-piece plastic fastener which may be assembled with the work structure without the aid of tools while still being highly effective to retain the panels of the work structure together in a secure manner and to seal the apertures in the panels against the passage of fumes, dust and the like.

While the preferred embodiments of the present invention have been shown and described herein, it is obvious that many structural details may be changed without departing from the spirit and scope of the appended claims.

The invention is claimed as follows:

1. A one-piece plastic fastener for connecting first and second apertured workpieces in a workpiece assembly with the workpieces separated by a layer of soft insulating material or the like; and comprising an imperforate head for overlying the first workpiece, a shank of compressible resilient plastic material integral with and extending axially from said head and adapted to be inserted through the apertured workpieces and to project beyond the second workpiece, said shank having transverse cross-sectional dimensions similar to the dimensions of the apertures in said workpieces, a plurality of collapsible resilient protuberances integral with said shank and extending outwardly beyond the diameter thereof for collapsing during insertion of the shank through the workpiece assembly and then springing outwardly for engaging a back side of the second workpiece, said shank having a recess immediately in rear of each said protuberance and inwardly of the shank diameter for receiving the material of the protuberance as they are collapsed during insertion through the workpiece assembly and with the remaining peripheral portions of the shank in the vicinity of the protuberances being in substantial sealing contact with the wall of the aperture in the second workpiece, said protuberances being of limited circumferential extent and arranged in a plurality of axially spaced rings with a plurality of pairs of generally oppositely disposed protuberances in each ring, the protuberances in each ring being circumferentially spaced from each other a distance at least substantially as great as the limited circumference extent of each protuberance, each of said protuberances including a generally radially extending surface facing said head and an inclined cam surface extending generally axially from said radially extending surface toward the free end of the shank, said radially extending surface meeting said cam surface along a relatively sharp corner to resist withdrawal of the fastener from the workpiece assembly, said radially extending surface diminishing in height from the mid-portion thereof toward opposite ends thereof and said cam surface being rounded transversely of the shank and diminishing in radial extent from its mid-portion toward its opposite sides so as to facilitate circumferential deformation and radial collapsing thereof into an adjacent recess during passage of the protuberances through the aperture in the second workpiece without injury thereto and subsequent outward springing of the protuberance for engaging the back side of the second workpiece.

2. A one-piece plastic fastener as claimed in claim 1, wherein the shank includes an axial bore starting at the entering end thereof and extending at least to a position in general radial alignment with said protuberances but terminating short of said head whereby to increase the collapsibility of the shank facilitating insertion of the shank through the apertured workpieces, and wherein the bore is provided with axial spline means disposed between said protuberances whereby to further increase the collapsibility of the shank without unduly weakening the portions of the shank directly behind the protuberances.

References Cited in the file of this patent

UNITED STATES PATENTS

| | | |
|---|---|---|
| 170,190 | Pratt | Nov. 23, 1875 |
| 1,743,493 | Sipe | Jan. 14, 1930 |
| 1,826,988 | Campbell | Oct. 13, 1931 |
| 1,915,249 | Jorgensen | June 20, 1934 |
| 1,974,160 | Pierson | Sept. 18, 1934 |
| 2,104,217 | Barnes | Jan. 4, 1938 |
| 2,180,960 | Kennedy | Nov. 21, 1939 |
| 2,200,227 | Olson | May 7, 1940 |
| 2,267,873 | Place | Dec. 30, 1941 |
| 2,368,200 | Cavanagh | Jan. 30, 1945 |
| 2,391,298 | Davis | Dec. 18, 1945 |
| 2,429,833 | Luce | Oct. 28, 1947 |
| 2,584,812 | Poupitch | Feb. 5, 1952 |
| 2,585,438 | Clingman | Feb. 12, 1952 |
| 2,650,516 | Poupitch | Sept. 1, 1953 |
| 2,709,290 | Rosenthal | May 31, 1955 |